Aug. 30, 1927.

M. RAMSEY 1,641,050

CULTIVATOR BLADE

Filed Aug. 26, 1926

M. Ramsey  Inventor

Patented Aug. 30, 1927.

1,641,050

UNITED STATES PATENT OFFICE.

MARCELLUS RAMSEY, OF NORTH GIRARD, PENNSYLVANIA.

CULTIVATOR BLADE.

Application filed August 26, 1926. Serial No. 131,690.

This invention relates to a cultivator blade or tooth, one of the objects being to provide a reversible device of this character which can be applied readily to the standard of a cultivator and which is so shaped and constructed as to make a clean cut through the soil and the vegetation thereon.

A further object is to provide a tooth of this character which will turn the loosened soil onto the grass or weeds.

A still further object is to provide a cultivator tooth which can be worked close to a row of plants without covering them and which can be pulled through the soil with less power than ordinarily required.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings.

Figure 1:
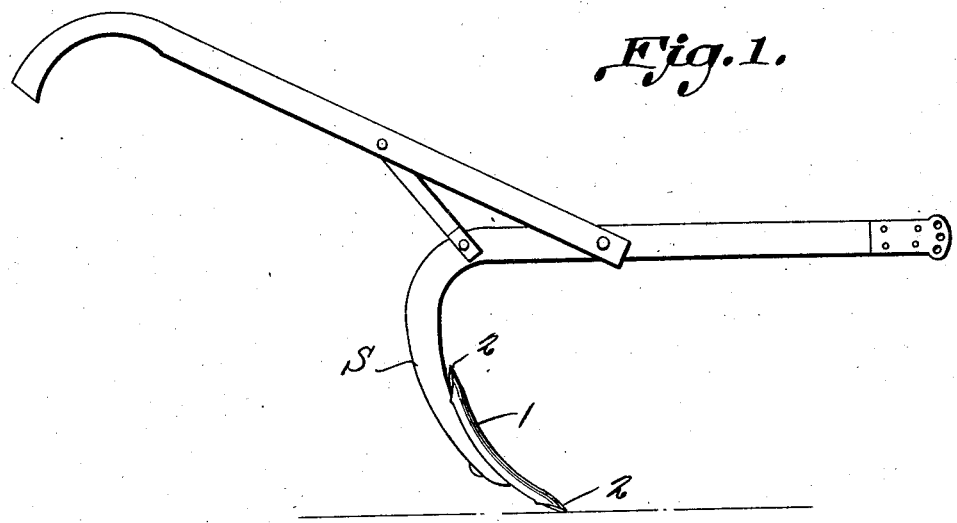
Figure 1 is a side elevation of a cultivator provided with a tooth such as constitutes the present invention.
Figure 2:
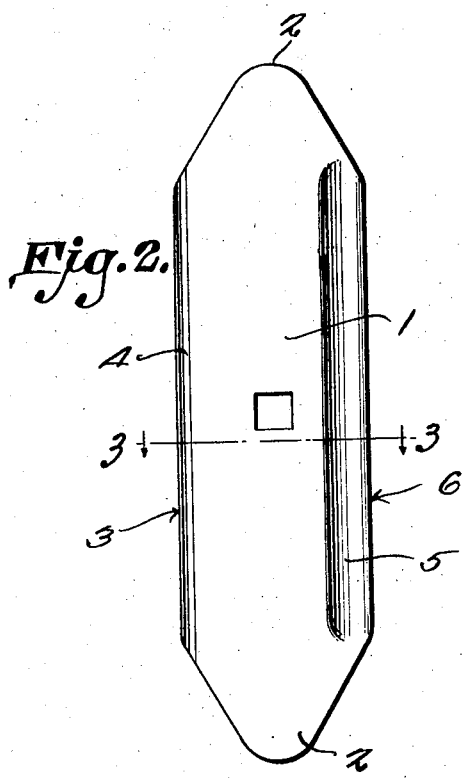
Figure 2 is a front elevation of the tooth.

Referring to the figures by characters of reference 1 designates a cultivator tooth curved from end to end and provided with a point 2 at each end. The tooth is rounded transversely so as to be fitted readily against a cultivator standard S to which it can be attached in the usual manner.

The tooth constituting the present invention differs from the ordinary tooth in that one side edge thereof is curved backwardly or rounded as at 3 so as to provide a laterally deflecting surface 4 along one side of the tooth. The other side portion of the tooth has a transversely rounded recess 5 extending longitudinally within the front face thereof, the outer side wall of this recess being extended forwardly to a longitudinal cutting edge 6.

It will be apparent that when a tooth is constructed as described the cutting edge 6 will shear easily through the soil and sod in the path thereof and the opposed longitudinal edge portions of the tooth will act to throw the loosened soil laterally away from the tooth and away from the plant or plants adjacent the cutting edge 6. Obviously, therefore, this tooth can be used close to a row of plants without danger of covering them.

Figure 3:
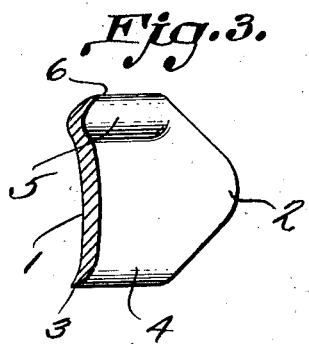
Figure 3 is a section on line 3—3, Figure 2.
Figure 4:
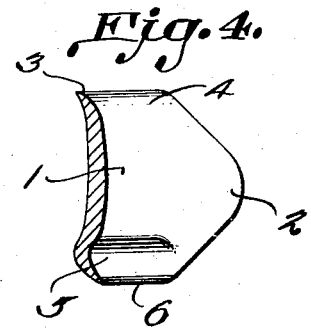
Figure 4 is a view similar to Figure 3 showing a tooth with a right-hand cutting edge.

The blade can be reversed to bring the cutting edge at either side desired. In Figure 4 the blade has been illustrated in position with its cutting edge at the right so that soil will be thrown toward the left in a direction opposite to that in which it would be shifted should the cutting edge be located at the left as in Figure 3.

What is claimed is:

A reversible cultivator tooth having a point at each end, one side edge portion of the tooth being curved backwardly and the other side portion of the tooth having a longitudinal recess in its front face, the outer side wall of said recess being extended forwardly to the side of the tooth to provide a longitudinal cutting edge.

In testimony that I claim the foregoing as my own, I have hereto affixed my signature.

MARCELLUS RAMSEY.